June 17, 1958  A. TEPLITZ  2,839,291
SWINGING SPOUT AND DRIVE THEREFOR
Filed March 11, 1955  6 Sheets-Sheet 1
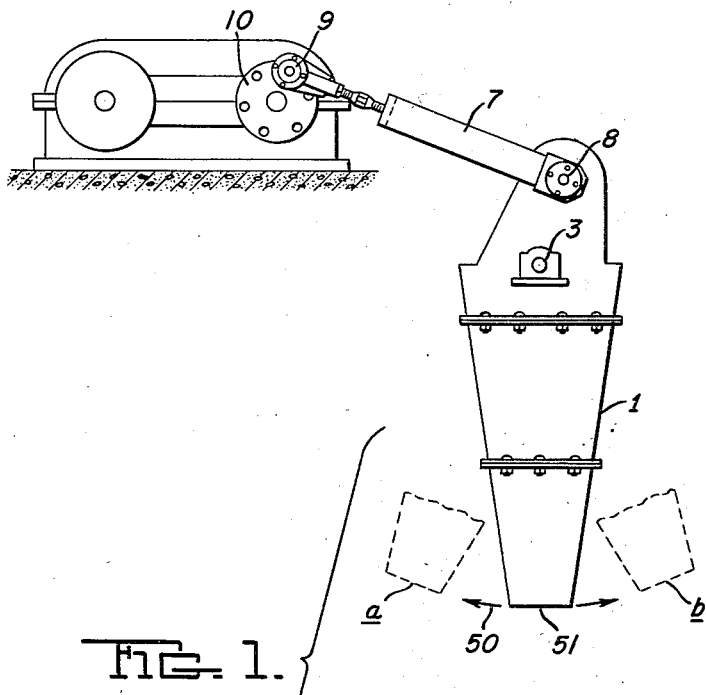
Fig. 1.
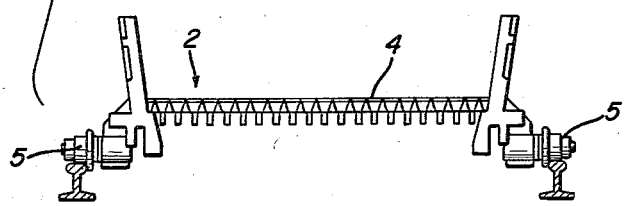
Fig. 7.
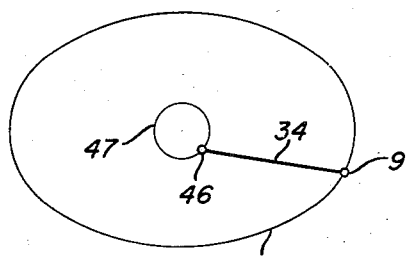
INVENTOR:
ALFRED TEPLITZ,
BY: Donald G. Dalton
his Attorney.

June 17, 1958  A. TEPLITZ  2,839,291
SWINGING SPOUT AND DRIVE THEREFOR
Filed March 11, 1955  6 Sheets-Sheet 2
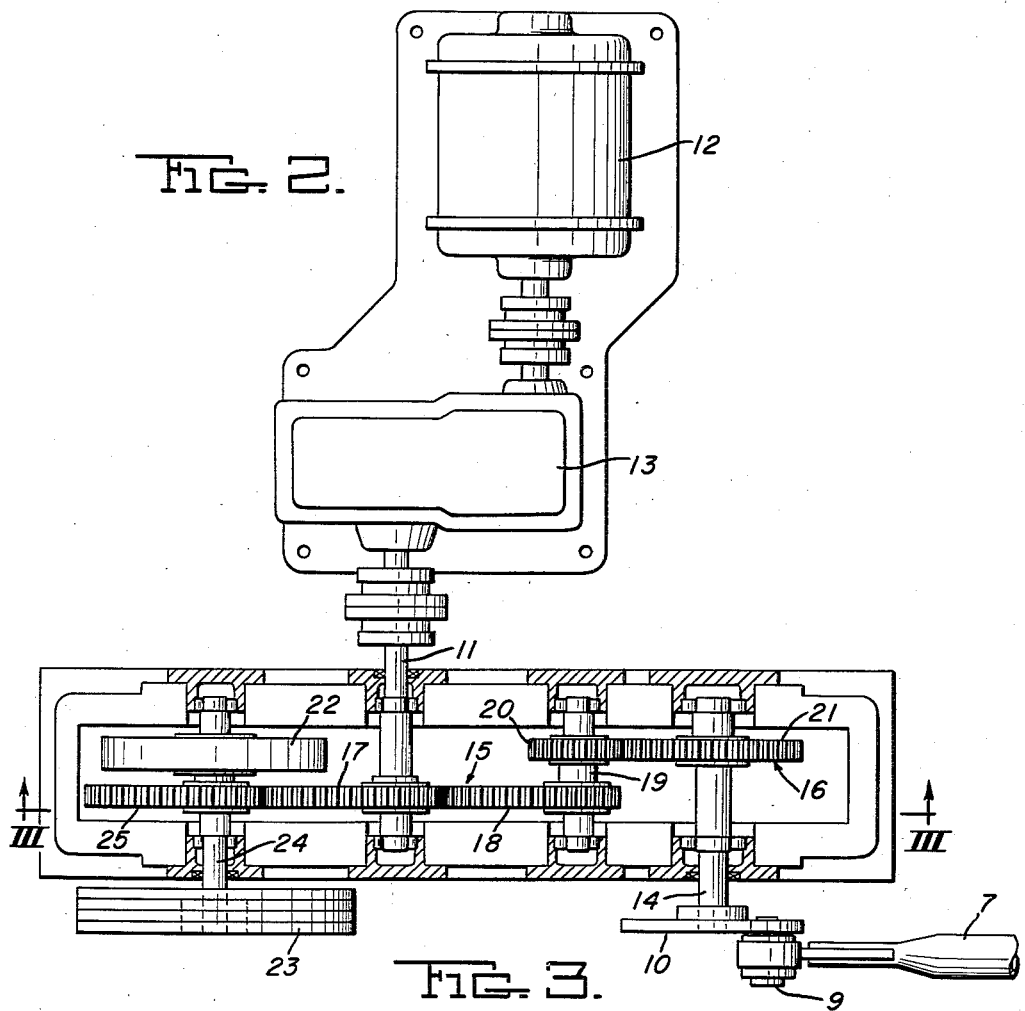
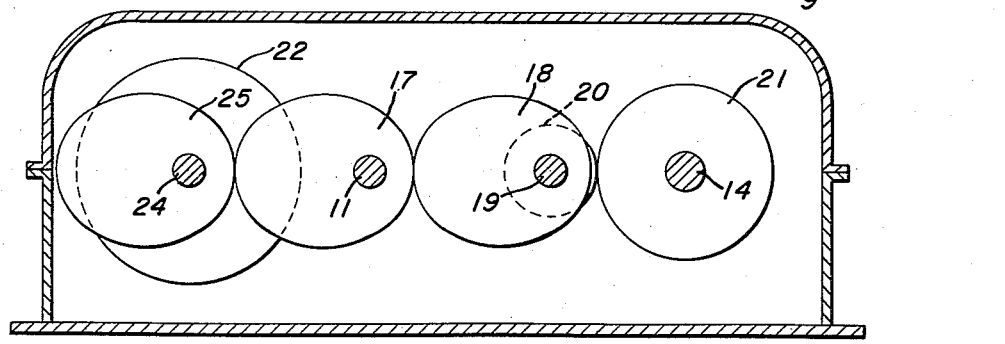
INVENTOR:
ALFRED TEPLITZ,
BY: Donald G. Dalton
his Attorney.

June 17, 1958 A. TEPLITZ 2,839,291
SWINGING SPOUT AND DRIVE THEREFOR
Filed March 11, 1955 6 Sheets-Sheet 3
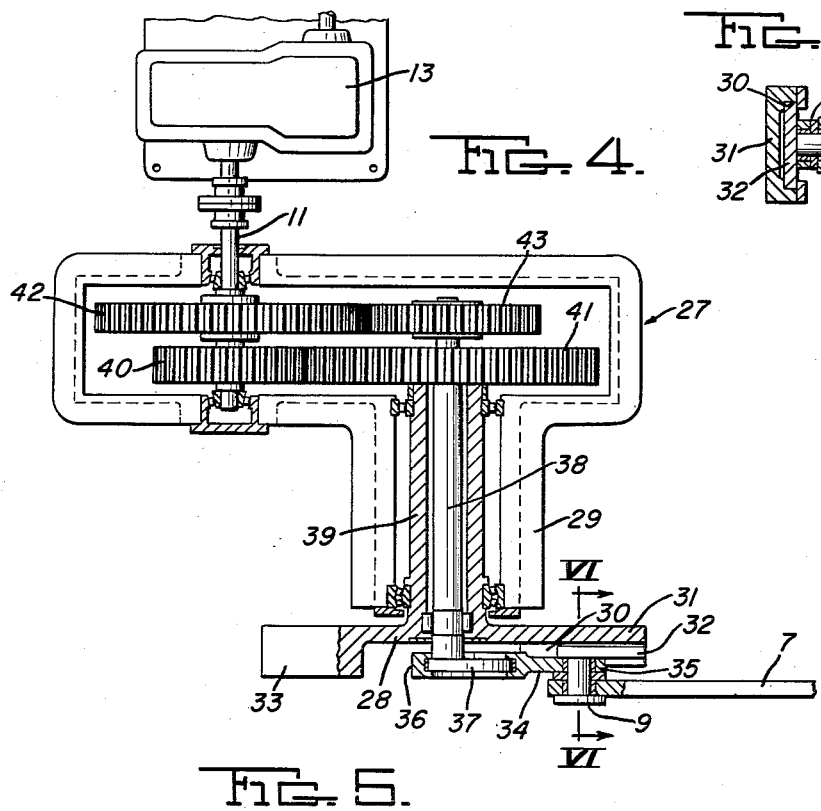
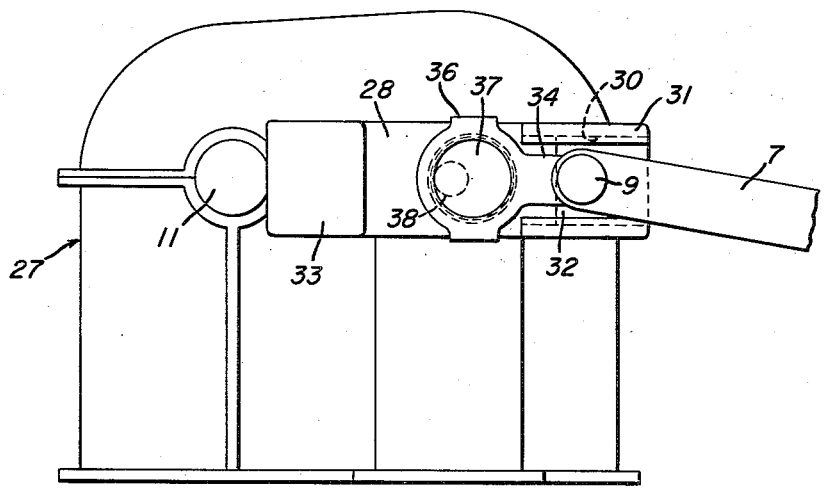
INVENTOR:
ALFRED TEPLITZ,
BY: Donald G. Dalton
his Attorney.

June 17, 1958 A. TEPLITZ 2,839,291
SWINGING SPOUT AND DRIVE THEREFOR
Filed March 11, 1955 6 Sheets-Sheet 4
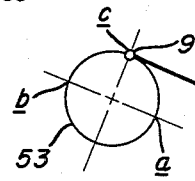
Fig. 8.
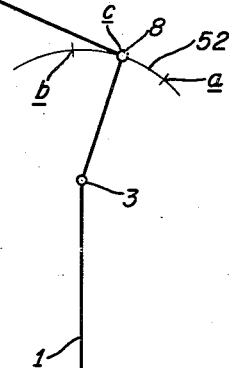
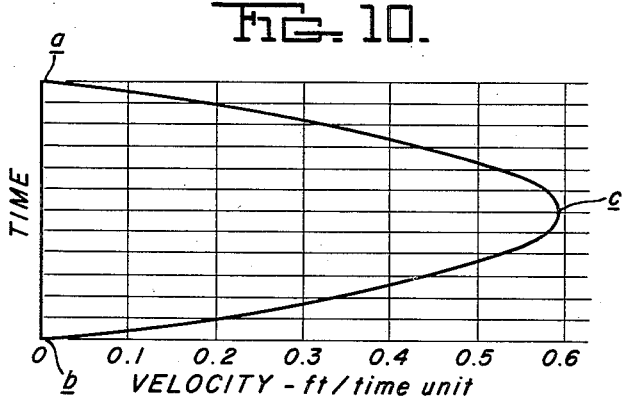
Fig. 10.
Fig. 9.
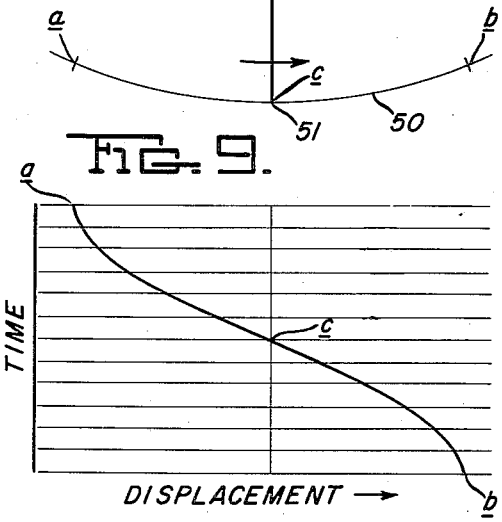
INVENTOR:
ALFRED TEPLITZ,
BY: Donald G. Dalton
his Attorney.

June 17, 1958 — A. TEPLITZ — 2,839,291
SWINGING SPOUT AND DRIVE THEREFOR
Filed March 11, 1955 — 6 Sheets-Sheet 5
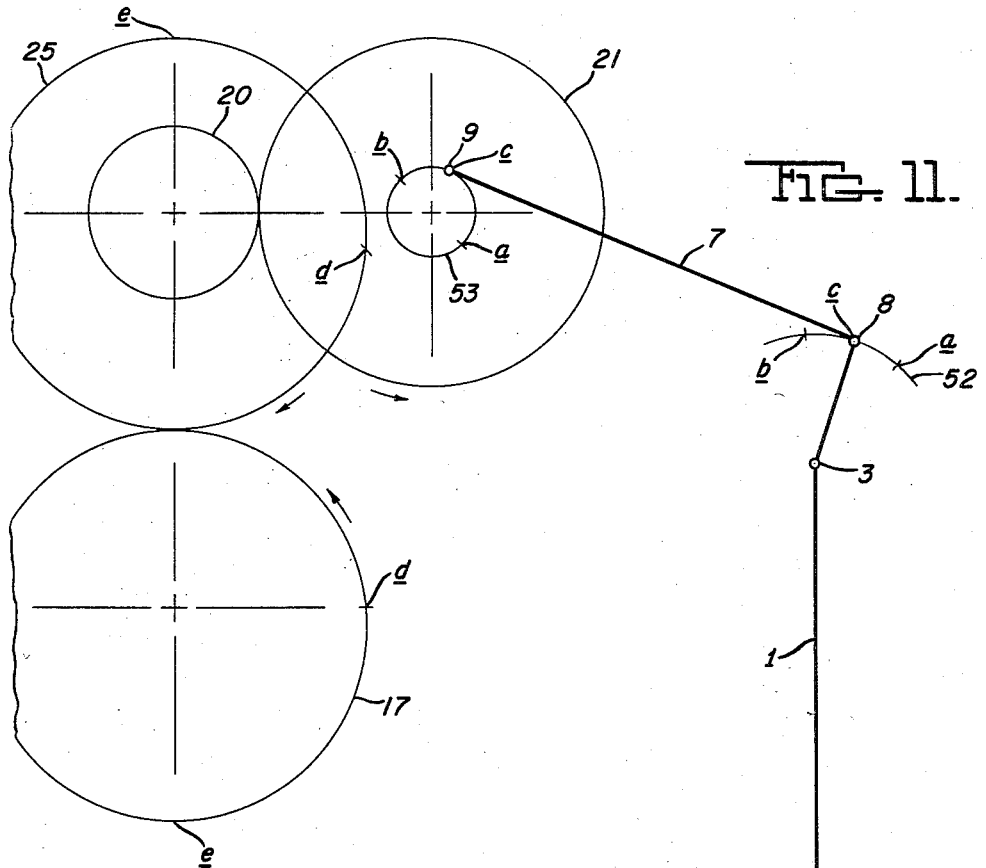
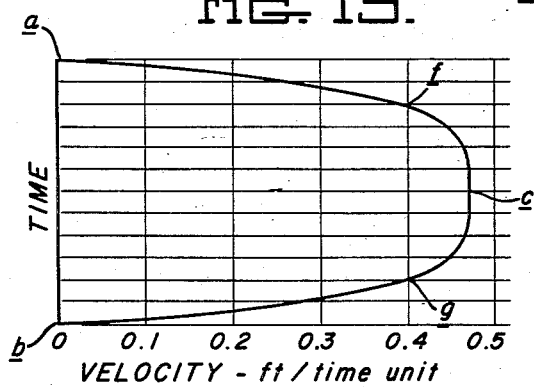
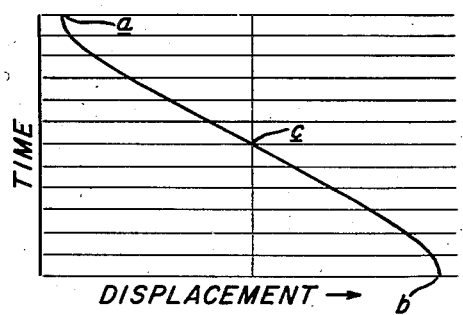
INVENTOR:
ALFRED TEPLITZ,
BY: Donald G. Dalton
his Attorney.

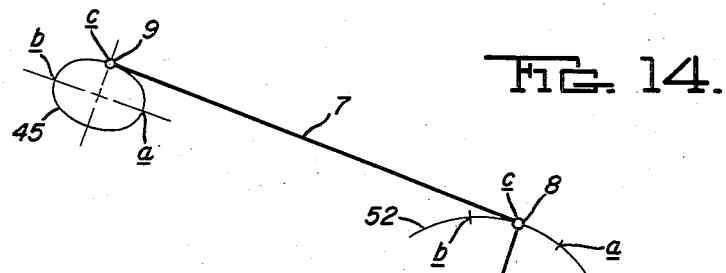
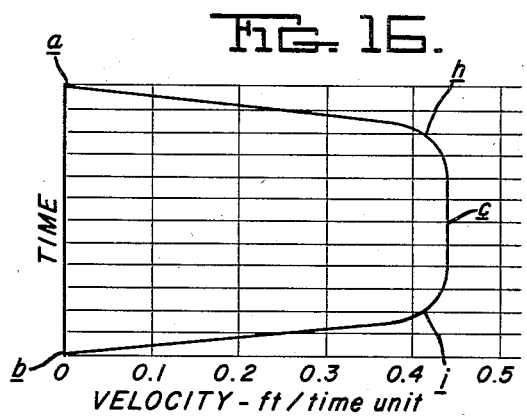
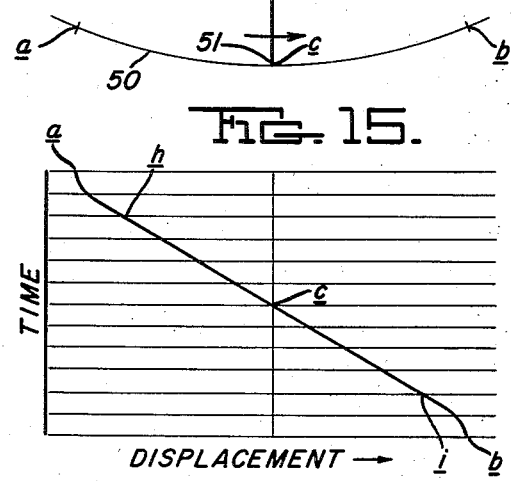

United States Patent Office 2,839,291
Patented June 17, 1958

1

2,839,291

SWINGING SPOUT AND DRIVE THEREFOR

Alfred Teplitz, Pittsburgh, Pa., assignor to United States Steel Corporation, a corporation of New Jersey Application March 11, 1955, Serial No. 493,745

11 Claims. (Cl. 266—21)

This invention is directed to the problem of depositing mixtures of materials to be sintered including blast furnace flue dust on the traveling grate of a sintering apparatus and, more particularly, is concerned with the provision of an improved arrangement of swinging spout drive which compared to conventional arrangements provides a more uniform depth of sintering bed from edge to edge of the grate. In a manner to be described, the improvements of this invention shorten the time intervals during which the spout is positioned over the edges of the grate and lengthens the time interval during which it moves over the center portion of the grate to thereby obtain a sintering bed of more uniform depth on the grate.

In the processing of materials to be sintered, a swinging spout mounted for oscillating movement across the grate receives the material directly from a pug mill and deposits it loosely on the grate in the form of an air permeable bed, the direct transfer of the material from the pug mill to the grate by the swinging spout being desirable in that it eliminates compacting and consequent destruction or deterioration of its air permeability. While transfer of the material to the grate in this manner is desirable, it is impossible to obtain a uniform depth of sintering bed with conventional arrangements of swinging spouts and drives therefor. This is due to the fact that oscillation of the spout is accomplished by a crank and pitman drive which imparts maximum velocity to the spout at the exact center of its path of oscillating movement and reduces its velocity to zero at the ends of its path of swinging movement. Since the material is fed by the pug mill to the spout at a constant rate, the velocity of spout movement is such that the depth of material deposited on the sintering grate is a maximum at its edges and a minimum at its center, thus presenting an unsatisfactory sintering condition in that the air permeability of the sintering bed varies with its depth across the grate and a uniform draft cannot be had. To correct this condition, leveling scrapers are provided for smoothing the bed to a more uniform depth but this again interferes with the sintering draft because the bed is compacted by the scrapers and its porosity or air permeability is deteriorated by the compacting action.

One of the principal objects of this invention is to provide improvements in a sintering apparatus which are effective in the production of a more uniform depth of sintering bed on the traveling grate than is possible in conventional constructions. To this end, the improvements of this invention modify the conventional movement pattern of a swinging spout by decreasing its velocity in the center portion of its path of movement to thereby increase the depth of sintering bed deposited on the center portion of the grate, by shortening the time interval during which movement of the spout is reversed at the edges of the grate to thereby decrease the depth of material piled by the spout on the edges of the grate, and by increasing its velocity to a maximum at a point substantially in advance of its movement over the center

2 of the grate and maintaining such maximum velocity during its movement to a similar point on the other side of the center of the grate, the distance between such points constituting a substantial portion of the path of arcuate movement of the spout. In a manner to be described, this is accomplished by continuously changing either the angular velocity of a rotating driving member or the effective length of a crank in accordance with the angular position of the swinging spout being operated thereby.

A more specific object of the invention is to provide a motion modifying mechanism intermediate a swinging spout drive pitman and a rotating drive shaft which will be effective to maintain the swinging movement of the spout at a substantially uniform and maximum velocity during a substantial portion of its path of arcuate movement and which will, as compared to conventional drives, reduce the time required for reversal of motion at the ends of such path.

A still more specific object of the invention is to provide an elliptical gear train for modifying the motion of a swinging spout in the manner referred to above.

Another still more specific object of the invention is to provide a crank of variable length together with a mechanism for automatically adjusting its length in accordance with the angular position of the spout for modifying the motion of a swinging spout in the manner referred to above.

Other objects and advantages of the invention will become apparent from the following description.

In the drawings there are shown preferred and modified embodiments of the invention. In this showing:

Figure 1 is a fragmentary end elevational view of a sintering apparatus showing the arrangement of its swinging spout with respect to a traveling grate and a crank and pitman drive for oscillating the spout over an arcuate path extending transversely of the grate;

Figure 2 shows a drive for modifying the movement pattern of the spout in accordance with the principles of this invention, the drive including an elliptical gear train intermediate the pitman crank and a speed reducing drive, the elliptical gear train being shown somewhat diagrammatically;

Figure 3 is a sectional view taken substantially along the line III—III of Figure 2;

Figure 4 shows a modified form of drive which is effective in a manner to be described for varying the length of the crank according to the angular position of the spout;

Figure 5 is a side elevational view of the drive shown in Figure 4;

Figure 6 is a sectional view taken along the line VI—VI of Figure 4;

Figure 7 is a schematic view showing the path of movement of the crank pin pivot connections of the drive shown in Figures 4 and 5;

Figures 8, 9, and 10 respectively are a kinematic diagram and a pair of graphs explaining the movement imparted to a swinging spout by a conventional drive;

Figures 11, 12, and 13 are views respectively similar to Figures 8, 9, and 10 but which explain the modified movement imparted to a swinging spout by the drive including the elliptical gear train shown in Figures 2 and 3; and Figures 14, 15, and 16 are views respectively similar to Figures 8, 9 and 10 but which explain the modified movement imparted to a swinging spout by the drive shown in Figures 4, 5, and 6.

In the drawings, Figure 1 shows a conventional arrangement of swinging spout 1 with respect to the traveling grate 2 of a sintering apparatus. The spout 1 is mounted by a pivot 3 for swinging movement over an arcuate path positioned above and extending transversely of the grate, its positions at the ends of such path being designated fragmentarily in dotted lines. The grate 2 includes pallets 4 on which an air permeable bed of the material to be sintered is deposited by the spout 1, the pallets 4 having rollers 5 at opposite edges thereof for engagement in supporting trackways which guide their movement in a direction normal to the plane of the drawing. Oscillation of the spout 1 between its end positions shown in dotted lines is effected by a pitman 7 having one of its ends pivotally connected at 8 with the spout 1 and the other of its ends pivotally connected with a crank pin 9 mounted on a crank disc 10. Each revlution of the crank pin 9 by the disc 10 is effective to oscillate the spout 1 back and forth over its path of arcuate movement. The apparatus thus far described is conventional.

The pattern of arcuate oscillating movement of the spout 1 is determined by the radius of rotation of the crank pin 9 and its angular velocity both of which are constant under conventional operating conditions. In accordance with the principles of this invention, the conventional pattern of swinging movement of the spout 1 is modified by continuously varying either the angular velocity or the radius of rotation of the crank pin 9 in accordance with the angular position of the spout 1 relative to the grate 2 to thereby obtain a more uniform depth of sintering bed on the grate. In a manner to be described, and according to a preferred embodiment of the invention, the angular velocity of the crank pin 9 is varied by providing an elliptical gear train between the crank disc 10 and a drive motor as shown in Figures 2 and 3. According to another embodiment of the invention, the radius of rotation of the crank pin 9 is varied by the crank mechanism shown in Figures 4 and 5.

In Figures 2 and 3, the drive for the crank disc 10 comprises a drive shaft 11 operated at a constant speed by a motor 12 and speed reducing transmission 13. The shaft 11 is connected with the crank disc drive shaft 14 through an elliptical gear train 15 and a speed reducing gear train 16. The elliptical gear train 15 comprises an elliptical drive gear 17 operated by the shaft 11 which has meshing engagement with a driven elliptical gear 18 keyed to a jack shaft 19. The speed reduction gear train 16 comprises a drive gear 20 keyed to the jack shaft 19 and a driven gear 21 keyed to the crank disc drive shaft 14. The gears 20 and 21 provide a 2:1 speed reduction for a reason to be described.

Operation of the elliptical gear train 15 is counterbalanced by a pair of fly wheels 22 and 23 mounted on a shaft 24. The shaft 24 is driven by an elliptical gear 25 which has meshing engagement with the elliptical drive gear 17. The fly wheel 23 is comprised of a plurality of discs which may be removed or added as needed.

The shape of the elliptical gears 17, 18, and 25 in the showings of Figures 2 and 3 has been exaggerated for the purpose of affording a better understanding of the invention. According to an example of the invention providing the movement pattern to be explained in connection with the showings of Figures 11 through 13, these gears respectively were constructed with a major axis of 15.005" and a minor axis of 14.945". It will of course be appreciated that the difference between the major and minor axes has been greatly exaggerated as shown in Figure 3.

In Figures 4 and 5, the crank pin 9 for the pitman 7 is connected to the output drive shaft 11 of the speed reduction unit 13 through a mechanism, designated as a whole by the numeral 27, for varying the effective radius of rotation of the crank pin 9. The mechanism 27 comprises a guide 28 mounted for rotation on a housing 29, the guide 28 having a trackway 30 in one arm 31 thereof in which a slide 32 is mounted for movement radially with respect to its center of rotation. The other arm 33 of the guide 28 acts as a counterweight for the arm 31. The crank pin 9 is secured to the slide 32 and has its position adjusted radially along the arm 31 by a connecting rod 34, the connecting rod 34 having a pivotal or wrist pin connection at its outer end 35 with the crank pin 9 and a bearing connection at its inner end 36 with an eccentric crank disc 37. The disc 37 is connected eccentrically to a drive shaft 38 and the rotating guide 28 has a quill drive shaft 39 arranged concentrically of the drive shaft 38.

The quill shaft 39 is driven from the shaft 11 by a gear train comprised of gears 40 and 41 providing a 2:1 speed reduction. The eccentric crank drive shaft 38 is driven from the shaft 11 by a pair of gears 42 and 43 providing a speed multiplying ratio of 3:2. By reason of these speed ratios, each revolution of the drive shaft 11 is effective to rotate the quill shaft 39 and the crank pin 9 through ½ revolution and to rotate the drive shaft 38 and eccentric drive disc 37 through 1½ revolutions. These ratios are essential to drive the pin 9 over an elliptical path designated by the numeral 45 in the kinematic diagram of Figure 7. In this diagram, the link 34 is indicated diagrammatically, and its inner end 46 moves over a circular path designated by the numeral 47, the radius of which is determined by the eccentricity of the crank 37. The outer end of the link 34 is connected with the pin 9 which, as indicated, moves over an approximately elliptical path 45 in a manner which is determined by the relative positions at any given instant of the ends of the link 34 which are being rotated by the guide 28 and disc 27 at different rotational speeds. From this showing, it will be apparent that the point 46 must move through an angle of 270° on the circle 47 to move the point or pin 9 through an angle of 90° along the approximately elliptical path 45. In other words, the angular velocity of the point 46 must be three times that of the pin 9 and this condition of operation is provided by the speed change ratios of the gear drives for the shafts 38 and 39 as described above. Since this drive causes the crank pin 9 to move over an elliptical path, it will be apparent that the effective radius of the crank 9 varies with its angular position along the path 45.

The manner in which the drives respectively shown in Figures 2 and 3 and in Figures 4 and 5 modify the conventional movement pattern of a swinging spout will be best understood by referring to the kinematic diagrams of Figures 8, 11, and 14 and the spout displacement and velocity curves in conjunction therewith. In these diagrams, the essential parts of the apparatus shown in Figure 1 have been illustrated schematically and are designated by corresponding numerals. These diagrams are scale drawings of an apparatus in which the pitman 7 has a length of 5'0½", the pivot point 8 is located a distance of 17½" from the pivot 3, and the spout has a length of 6'0" between the pivot 3 and its lower end. In each of these diagrams and in the showing of Figure 1, the numeral 50 designates the arcuate path over which the center point 51 of the lower end of the spout is oscillated by the pitman 7, the end points of the path 50 being designated by the letters a and b and being respectively located over opposite edges of the grate 2. The pivot 8 also moves over an arcuate path, designated by the numeral 52, having end points which have been similarly designated by the letters a and b. In the diagrams of Figures 8 and 11, the crank pin 9 has a rotational radius of 6½" which is determined by its connection with the crank disc 10 of Figure 1 and moves over a circular path 53 on which the points designated a and b correspond to the positions of the spout 1 when at the ends of its path of swinging movement designated by these letters. In the showing of Figure 14, the elliptical path 45 shown in Figure 7 over which the pin 9 travels has been reproduced and the letters a and b designate the positions occupied by the pin 9 when the spout is at the ends of its path of swinging movement designated by these letters. In each of these diagrams, the parts designated by the numerals 9, 8, and 51 move simultaneously to and away from the points designated by the letters a and b.

In the displacement and velocity graphs respectively associated with each of Figures 8, 11, and 14, the horizontal lines designate equal time intervals during movement of the point 50 over its arcuate path, for example, from the point $a$ to the point $b$. In the showings of Figures 9 and 10, the time intervals are determined by equal angular divisions along the path 53 of Figure 8 between the points $a$ and $b$ and over which the crank pin 9 moves at a constant angular velocity. In the showings of Figures 12 and 13, the time intervals correspond to equal angular movements of the elliptical gear 17 during one complete revolution thereof which it will be recalled is rotated at a constant angular velocity by the shaft 11. In the showing of Figure 15, the time intervals correspond to equal angular movements of the pin 9 about its center of movement and along the path 45, it being recalled that the pin 9 is driven at a constant angular velocity by the rotating guide 28 and quill shaft 39 (see Figure 4).

The displacement curves of Figures 9, 12, and 15 were plotted by mechanically locating the positions of the point 51 along its path 50 of arcuate movement according to the position of the pin 9 at each of the equal time intervals. The projection of these positions downwardly gives points of intersection with the corresponding horizontal time lines of Figures 9, 12, and 15 and provides plotting points from which the displacement curves of these figures were obtained. From the displacement curves of Figures 9, 12, and 15, the corresponding velocity curves of Figures 10, 13 and 16 were plotted, the horizonal lines in these figures designating the same time intervals as in the displacement curves.

Referring specifically to the displacement curve of Figure 9, it will be noted that the displacement for the time intervals adjacent the points $a$ and $b$ is relatively small and that the greatest displacement takes place adjacent the point $c$. From Figure 10, it will be noted that the velocity of the point 51 is a maximum at the point $c$ and decreases quite rapidly with its movement away from this point. These curves illustrate the pattern of swinging movement of a spout under conventional operating conditions with the crank disc 10 rotating at a constant speed. Since the pug mill (not shown) feeds material at a constant rate to the spout 1, it will be apparent that the depth of the sintering bed on the grate 2 will vary with the velocity of swinging movement of the spout 1. Accordingly, and with reference to the curves shown in Figures 9 and 10, it will be further apparent that the depth of sintering bed on the grate 2 will vary considerably in a transverse direction and will be a minimum at its center and a maximum at its edges.

The manner in which the elliptical drive of Figures 2 and 3 modifies the conventional pattern of swinging movement of the spout 1 will be best understood by referring to Figures 11, 12, and 13. In Figure 11, the elements of the elliptical gear drive for the pitman 7 are shown diagrammatically to enable an understanding to be had of the manner in which it operates to vary the angular velocity of the crank pin 9 and thus modifies the conventional pattern of movement of a swinging spout. Figure 11 shows the relative positions of the parts of the drive when the spout 1 is at the center $c$ of its path of swinging movement. In this showing, it will be noted that the portion of the gear 17 having the shortest radius is engaged with the portion of the gear 25 having the greatest radius and that, although the spout has its maximum velocity at this point due to the location of its crank pin 9 on the circle 53, the elliptical gear 25 will be rotating at a lower angular velocity than the velocity of the elliptical gear 17. This reduction in angular velocity of the gear 25 is effective to lower the maximum velocity of the spout 1 at the point $c$ as compared to conventional drives as will be apparent from a comparison of Figures 10 and 13.

Movement of the gear 17 through an angle of 90° from the position shown in Figure 11 results in movement of the point $d$ on its periphery into engagement with the point $d$ on the periphery of the gear 25 and the gear 25 will thus have been moved through an angle of less than 90° and at a slower angular velocity than the gear 17. When the gear 17 rotates through the next angle of 90° to move the points $e$ into meshing engagement, it will be apparent that the gear 25 will have been moved through an angle of greater than 90° and at a higher angular velocity than the gear 17. As the points $e$ move into meshing engagement, the spout will be moving into one of its end points $a$ or $b$, and the increase in the angular velocity of the gear 25 at these points is effective to shorten the period of time in which the spout dwells at the end points of its path of swinging movement. Since each of the gears 17 and 25 must move through an angle of 180° to move the pin 9 through an angle of 90°, it will be apparent that such gears must be rotated through a complete revolution to move the pin 9 between the points $a$ and $b$ and the spout 1 over the arcuate path 51 between the similar end points $a$ and $b$. The 2:1 speed reduction of the gears 20—21 is required for reversal of the movement of the spout when it moves to either of the end points of its path of movement and to render the elliptical gear drive 17—25 operative.

Comparing the curves of Figures 12 and 13 with the conventional curves of Figures 9 and 10, it will be apparent that the displacement curve of Figure 12 has a more uniform slope between the points $a$ and $b$ than does the displacement curve of Figure 9 and that the spout 1 moves a greater distance out of its end positions $a$ and $b$ in a given unit of time and moves a lesser distance at the mid point of its path of movement for a given interval of time compared to conventional operation. Referring to the velocity diagram of Figure 13, it will be apparent that the greatest change in velocity takes place outside the points $f$ and $g$, and that the spout may be regarded as having a substantially constant velocity, that is, its maximum velocity, during its movement between the points $f$ and $g$. Since the time interval between the points $f$ and $g$ represents almost two-thirds of the total time of movement of the spout 1 in either direction, it will be apparent that the spout remains over the edges of the grate for a lesser period of time and over its center for a greater period of time as compared to the conventional drive of Figure 8. In this manner, and compared to the conventional drive, it will be further apparent that the elliptical drive of Figure 11 reduces the pile up of material at the edges of the sintering grate 2 and increases the depth of the sintering bed in the central portion thereof to thereby provide a more uniform depth of sintering bed across the grate 2.

Figure 14 shows the position of the pivot connection 9 along the elliptical path 45 when the center point 51 of the spout 1 is positioned centrally of its arcuate path of movement 50 and thus over the center of the grate. In this position, the crank pin 9 has its shortest effective length. As the pin 9 moves toward or away from this position, the effective length of its crank arm is changed while being rotated at a constant angular velocity to obtain a modified pattern of movement of the spout compared to the conventional pattern as shown in Figures 9 and 10. Referring to Figure 15, it will be noted that the displacement for each interval of time between the points $h$ and $i$ is substantially constant and less than that for corresponding intervals of time as shown in Figure 9. Referring to the velocity curve of Figure 16, it will be noted that the maximum velocity of the spout is less than the maximum of Figure 10 and is substantially constant between the points $h$ and $i$. The time interval between these points is about two-thirds of the total time of travel and the displacement of the spout 1 during this interval constitutes a greater proportion of its total travel due to its movement at its maximum velocity. Since the velocity change required for reversal takes place in the remaining portion of spout travel, that is, outside the points h and i, it follows that the spout dwells at the ends of its path of movement and over the edges of the grate 2 for lesser periods of time than in the conventional arrangement of Figure 8. Since the maximum velocity is decreased compared to the conventional drive of Figure 8 during the center portion of its movement, it is caused to remain over the center portion of the grate for longer periods of time. It will thus be apparent that varying the length of the crank 9 with the angular position of the spout 1 as accomplished by the drive shown in Figure 14 is effective to provide a more uniform depth of sintering bed on the grate than is possible with the conventional drive of Figure 8.

From the foregoing, it will be apparent that the elliptical drive of Figures 2 and 3 and the variable crank drive of Figures 4 through 6 are effective to modify the conventional movement of the swinging spout 1 in such manner that a more uniform depth of sintering bed is provided in a direction transversely of a traveling grate 2. Attention is particularly directed to the fact that this is accomplished, in the elliptical gear drive of Figures 2 and 3, by continuously varying the angular velocity of the crank pin 9 and, in the drive of Figures 4 through 6, by continuously varying the effective crank length of the crank pin 9, both in accordance with the angular position of the spout 1. In both embodiments, the swinging movement of the spout is accelerated to a maximum at a point substantially in advance of its movement to the center point of its path of movement and this velocity is maintained until the spout reaches a similar point on the other side of its path of swinging movement. The spout is thereby caused to reverse its direction of travel in a much shorter period of time, compared to conventional drives, at the ends of its path of swinging movement and the pile up of material on the edges of the grate is materially decreased. By causing the spout to move it a substantially constant maximum velocity during the center portion of its path of movement which is substantially less than the maximum velocity of a conventionally driven spout, a greater quantity of material is deposited on the center portion of the traveling grate. These changes in the conventional pattern of movement of a swinging spout are effective to provide a sintering bed of sintering material on a traveling grate which has a more uniform depth in a direction transversely of the grate than is possible with conventional drives. The air permeability of the sintering bed for combustion purposes is thus improved and a better quality of sintered product is obtained.

While several embodiments of my invention have been shown and described it will be apparent that other adaptions and modifications may be made without departing from the scope of the following claims.

I claim:

1. In a sintering apparatus, an oscillating drive for operating a swinging spout over an arcuate path positioned above and extending transversely between the edges of a traveling grate comprising a pitman having one end pivotally connected with said spout, a drive member rotating at a constant angular velocity, and drive means connecting said drive member with the other end of said pitman including means for maintaining the swinging movement of said spout at a maximum and substantially constant velocity during a central and substantial portion of its movement from one end to the other of said path, and for reversing its movement at the ends of said path.

2. A drive as defined in claim 1 characterized by the portion of said path over which the spout has a substantially constant maximum velocity extending from a point adjacent one end thereof to a point adjacent the other end thereof, both of said points being spaced respectively substantial and equal distances from the center of said path.

3. A drive as claimed in claim 1 characterized by said last named means comprising a crank operated at a constant angular velocity and connected with said pitman, and means for continuously varying the effective length of said crank in accordance with its angular position.

4. A drive as claimed in claim 1 characterized by the last named means comprising a first elliptical gear connected with said drive member, a second elliptical gear meshing with said first gear, and means providing a driving connection between said second gear and said pitman.

5. A drive as claimed in claim 4 characterized by said driving connection means comprising a crank connected with said pitman, and gear train providing a speed reducing ratio of 2:1 connecting said second elliptical gear with said crank.

6. In a sintering apparatus, an oscillating drive for operating a swinging spout over an arcuate path positioned above and extending transversely between the edges of a traveling grate comprising a pitman having one end pivotally connected with said spout, a crank having a pin at its outer end connected with the other end of said pitman, a first elliptical gear rotating at a constant angular velocity, a second elliptical gear driven by said first gear, and a gear train providing a speed reducing ratio of 2:1 connecting said second elliptical gear with said crank.

7. In a sintering apparatus, an oscillating drive for operating a swinging spout over an arcuate path positioned above and extending transversely between the edges of a traveling grate comprising a pitman having one end pivotally connected with said spout, a crank pin connected with the other end of said pitman, a crank for rotating said crank pin and having a slide in which said pin is mounted for radial movement relative thereto, means for rotating said crank at a constant angular velocity, and means for continuously varying the position of said pin radially of said crank in accordance with the angular position of the crank.

8. In a sintering apparatus, an oscillating drive for operating a swinging spout over an arcuate path positioned above and extending transversely between the edges of a traveling grate comprising a pitman having one end pivotally connected with said spout, a crank pin connected with the other end of said pitman, a crank for rotating said crank pin and having a slide in which said pin is mounted for radial movement relative thereto, a quill shaft for rotating said crank, a first gear train for rotating said quill shaft at a predetermined speed, a crank and pitman for reciprocating said pin in said crank slide, a drive shaft extending concentrically of said quill shaft for rotating said last named crank, and a second gear train for rotating said drive shaft, said first and second gear trains having relatively different ratios whereby rotation of said drive and quill shafts is effective to move said pin over a substantially elliptical path.

9. In a sintering apparatus, a traveling grate, a swinging spout having a pivotal support for oscillating movement over an arcuate path positioned above and extending transversely between the edges of said grate, and a drive for oscillating said spout comprising a pitman having one end pivotally connected with said spout, a drive member rotating at a constant angular velocity, and drive means connecting said drive member with the other end of said pitman including means for maintaining the swinging movement of said spout at a maximum and substantially constant velocity during a central and substantial portion of its movement from one end to the other of said path, and for reversing its movement at the ends of said path.

10. In a sintering apparatus, a traveling grate, a swinging spout having a pivotal support for oscillating movement over an arcuate path positioned above and extending transversely between the edges of said grate, and a drive for oscillating said spout comprising a drive member operating at a constant angular velocity, and a drive connecting said drive member with the swinging spout including means for maintaining the velocity of swinging movement of the spout at a substantially constant and maximum value over a substantial and central portion of its path of swinging movement, and for reversing its movement at the ends of said path.

11. In a sintering machine, the combination of a traveling grate and an apparatus for depositing material to be sintered on said grate in a bed having a uniform depth over a substantially large central portion of the distance between the edges of said gate, said apparatus comprising a swinging spout through which said material is fed at a constant rate, a pivot support mounting said spout for oscillating movement over an arcuate path above and extending transversely between the edges of said grate, a pitman having one end pivotally connected with said spout, a drive shaft rotating at a constant angular velocity, and drive means connecting said drive shaft with the other end of said pitman including means for accelerating the motion of said spout to a maximum velocity at a point spaced from the center of its said arcuate path and lying over one edge of said bed central portion and for maintaining said velocity substantially constant during movement of said spout over said bed central portion whereby the said central portion of said bed has a uniform depth in a direction transversely of said grate, said last named means being further operative to reverse the movement of said spout at the ends of said path.

References Cited in the file of this patent

UNITED STATES PATENTS

| | | |
|---|---|---|
| 364,828 | Ledyward | June 14, 1887 |
| 463,980 | Allen | Nov. 24, 1891 |
| 485,738 | Emerson | Nov. 8, 1892 |
| 604,487 | Boonen | May 24, 1898 |
| 1,412,183 | Kuhlman | Apr. 11, 1922 |
| 1,507,908 | Crawford | Sept. 9, 1924 |
| 2,037,407 | Cremer | Apr. 14, 1936 |
| 2,143,236 | Birk | Jan. 10, 1939 |
| 2,253,270 | Golber | Aug. 19, 1941 |
| 2,392,349 | Webb | Jan. 8, 1946 |
| 2,409,378 | Morgan | Oct. 15, 1946 |

FOREIGN PATENTS

| | | |
|---|---|---|
| 691,545 | Germany | May 30, 1940 |
| 886,391 | France | July 5, 1943 |

OTHER REFERENCES

Spur Gears, Earle Buckingham, page 93, McGraw-Hill Book Co., 1928.